UNITED STATES PATENT OFFICE.

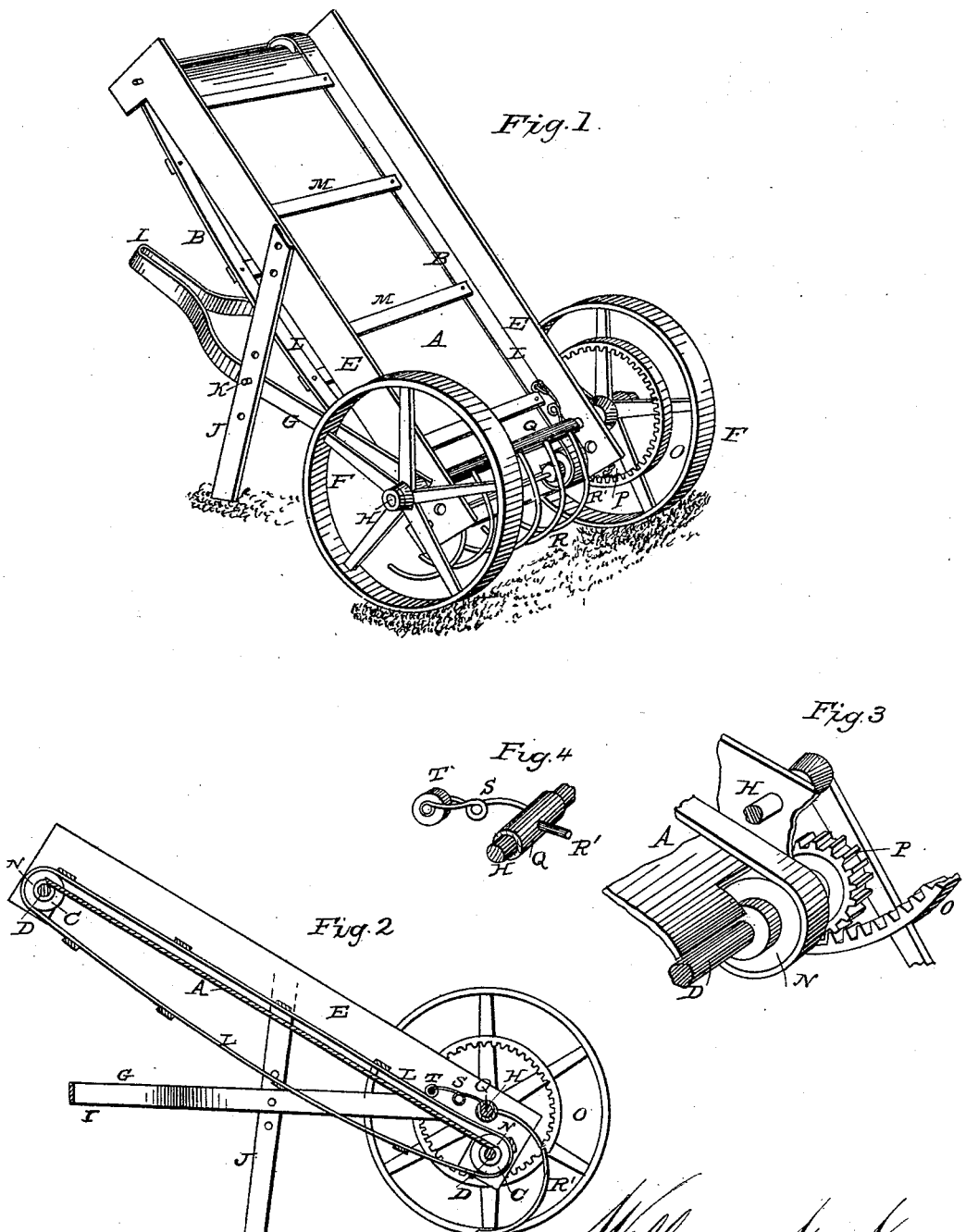

WILLIAM W. NEW, OF PERRY, ILLINOIS.

COMBINED HAY RAKE AND LOADER.

SPECIFICATION forming part of Letters Patent No. 272,747, dated February 20, 1883.

Application filed December 16, 1882. (No model.)

*To all whom it may concern:*

Be it known that I, WILLIAM WELLINGTON NEW, of Perry, in the county of Pike and State of Illinois, have invented certain new and useful Improvements in Combined Hay Rakes and Loaders; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hay-loader. Fig. 2 is a longitudinal vertical section of the same, and Figs. 3 and 4 are detail views.

Similar letters of reference indicate corresponding parts in all the figures.

My invention has relation to combined hay rakes and loaders; and it consists in the improved construction and combination of parts of the same, as hereinafter more fully described and claimed.

In the accompanying drawings, the letter A indicates the inclined platform, over which the hay is carried by an endless belt, B, running over rollers C, two in each end of the inclined plane, fastened upon shafts D, journaled in bearings in the sides E of the inclined plane.

The machine is mounted upon two wheels, F F, in the lower end of the incline, and is attached to the wagon that is to be loaded by draft-bars G, hinged to the axle H of the wheels and connected in front, forming an eye, I.

Two uprights, J, depend from the frame A, and have a series of bolt-holes registering with bolt-holes in the parallel sides of the draft-bars, whereby the pitch of the incline may be adjusted by means of bolts K.

The endless apron B consists of two endless straps, L L, which run over the rollers C, and a series of cross-laths, M, fastened by their ends to the straps L. The rollers C have a heavy tire, N, of rubber or other yielding material, so as to preserve the tension upon the belt B without need of adjusting-screws and sliding bearings for the shafts D, as the rubber will yield if the belt is tight and will expand when the belt stretches.

The outer ends of the inclined plane A are curved downward toward the shafts D, thus preventing the hay from catching under the bottom A.

One of the wheels F has an interior cogged rim, O, which engages a pinion, P, which is fast upon shaft D, and actuates the endless apron.

This mechanism may be provided with any suitable means for disconnecting with the drive-wheel.

The rake-head Q is tubular, and is placed around the axle H, upon which it turns.

The teeth R, which are of the usual construction, are removably fastened upon the rake-head, and the two R' nearest the ends of the rake extend forward from their fastenings, and after forming a spiral, S, they are drawn straight forward, and have rollers T journaled upon their ends. These rollers run upon the upper surfaces of the straps L L, and the springiness of the prolonged ends of the rake-teeth having the spiral S bears the rake-teeth down, but will admit of their giving way for any obstacles.

Having thus described my invention, I claim and desire to secure by Letters Patent of the United States—

In a combined hay loader and rake, the combination of the rake having the end teeth, R', extending forward over the head, forming spring-coils S, and provided with rollers T upon their ends, with the endless apron upon whose sides the said rollers bear, substantially as and for the purpose shown and set forth.

In testimony that I claim the foregoing as my own I have hereunto affixed my signature in presence of two witnesses.

WILLIAM WELLINGTON NEW.

Witnesses:
 DANA DOANE,
 IRA W. STEVENSON.